(12) United States Patent
Kim et al.

(10) Patent No.: US 10,208,713 B2
(45) Date of Patent: Feb. 19, 2019

(54) CANISTER WITH HEATER

(76) Inventors: Hyun Kl Kim, Pyeongtaek-si (KR);
Tae Kyu Hwang, Pyeongtaek-si (KR);
Joon Young Choi, Ansung-si (KR)

(*) Notice: Subject to any disclaimer, the term of this patent is extended or adjusted under 35 U.S.C. 154(b) by 0 days.

(21) Appl. No.: 13/166,761

(22) Filed: Jun. 22, 2011

(65) Prior Publication Data

US 2011/0308394 A1 Dec. 22, 2011

(30) Foreign Application Priority Data

Jun. 22, 2010 (KR) .................. 10-2010-0058857
Oct. 12, 2010 (KR) .................. 10-2010-0099075

(51) Int. Cl.
*F02M 25/08* (2006.01)
*B01D 53/04* (2006.01)

(52) U.S. Cl.
CPC .......... *F02M 25/089* (2013.01); *B01D 53/04* (2013.01); *F02M 25/0836* (2013.01); *F02M 25/0854* (2013.01); *B01D 2259/4516* (2013.01)

(58) Field of Classification Search
CPC .......... F02M 25/0836; F02M 25/0854; F02M 25/089; B01D 53/04; B01D 2259/4516
USPC ........................................................ 96/146
See application file for complete search history.

(56) References Cited

U.S. PATENT DOCUMENTS

| 4,721,846 A * | 1/1988 | Lupoli et al. ............. 219/206 |
| 4,778,495 A * | 10/1988 | Bishop et al. .................. 96/141 |
| 6,230,693 B1 * | 5/2001 | Meiller et al. ................ 123/519 |
| 6,279,548 B1 * | 8/2001 | Reddy ............................ 123/520 |
| 2003/0064002 A1 * | 4/2003 | Jaworski et al. ............... 422/28 |
| 2004/0094132 A1 * | 5/2004 | Fujimoto et al. ............. 123/519 |
| 2004/0140095 A1 * | 7/2004 | Vinegar et al. ............... 166/302 |
| 2007/0051345 A1 * | 3/2007 | Potier ........................... 123/519 |
| 2008/0041226 A1 * | 2/2008 | Hiltzik et al. .................. 95/90 |

FOREIGN PATENT DOCUMENTS

KR   10-2007-0049425   5/2007

OTHER PUBLICATIONS

ASM International Handbook Committee (1993). ASM Handbook, vol. 06—Welding, Brazing, and Soldering . . . ASM International. Online version available at: http://www.knovel.com/web/portal/browse/display?_EXT_KNOVEL_DISPLAY_bookid=3110&VerticalID=0.*

* cited by examiner

*Primary Examiner* — Frank M Lawrence, Jr.
(74) *Attorney, Agent, or Firm* — IPLA P.A.; James E. Bame

(57) ABSTRACT

The present invention provides a canister mounted in a vehicle to reduce the discharge of fuel gas and, more particularly, a canister with a heater configured such that fuel gas adsorbed onto active carbon filled in the canister is more easily desorbed from the active carbon and introduced into an engine. The canister with the heater according to the present invention includes a canister housing including a tank port and a purge port, which are provided at the top thereof, and a plurality of inlet holes provided on one side thereof to introduce air; and a heater connected to the top of the plurality of inlet holes of the canister housing and including an air port provided at the top thereof, an open bottom, and a heater module provided therein.

8 Claims, 6 Drawing Sheets

CANISTER WITH HEATER

CROSS-REFERENCE TO RELATED APPLICATION

This application claims the benefit of Korean Patent Application No. 10-2010-0058857, filed on Jun. 22, 2010, and Korean Patent Application No. 10-2010-0099075, filed on Oct. 12, 2010, the entire disclosures of which are hereby incorporated by reference.

BACKGROUND OF THE INVENTION

1. Field of the Invention

The present invention relates to a canister mounted in a vehicle to reduce the discharge of fuel gas and, more particularly, to a canister with a heater configured such that fuel gas adsorbed onto active carbon filled in the canister is more easily desorbed from the active carbon and introduced into an engine.

2. Description of Related Art

Typically, an apparatus for storing fuel gas generated from a fuel tank and transferring it to an engine is employed in a vehicle, and such an apparatus is generally referred to a canister.

Fuel required for driving the engine is stored in the fuel tank. When the fuel is evaporated in the fuel tank by environmental factors such as ambient temperature and the like, the fuel gas is generated. The fuel gas contains harmful components such as hydrocarbon (HO) and the like, and thus, if the fuel gas is discharged to the outside of the vehicle, the air is polluted and the fuel is wasted.

The canister adsorbs and stores the fuel gas generated from the fuel tank when the engine stops using active carbon filled in the canister and retransfers the stored fuel gas to the engine when the engine is running, thereby preventing the air pollution and the loss of fuel. Korean Patent Publication Nos. 2004-0090740, 2004-0017053, 2003-0089139, and 2001-0036538 disclose these types of canisters.

FIG. 1 is a schematic diagram showing the connection of a canister 1 and a fuel tank 2.

As shown in FIG. 1, an inlet pipe 3 of the canister 1 is connected to the fuel tank 2. When the vehicle engine is turned off, the fuel gas generated from the fuel tank 2 is introduced to the canister 1 through the inlet pipe 3 by the internal pressure of the fuel tank 2.

Active carbon is filled in the canister 1 to adsorb the fuel gas. The fuel gas introduced through the inlet pipe 3 is adsorbed onto the active carbon in the canister 1. Of course, in this case, the remaining fuel gas, which is not adsorbed onto the active carbon, is discharged to the air through a discharge pipe 4 connected to the canister 1.

Moreover, the canister 1 is connected to a throttle tube 6 through a guide pipe 5, and the guide pipe 5 includes a control valve 7 for preventing the fuel gas from being introduced from the canister 1 to the throttle tube 6. The control valve 7 is closed when the engine is stopped, and opened when the engine is running.

When a driver starts the vehicle to run the engine, the air is supplied to the engine through the throttle tube 6. In this state, the internal pressure of the throttle tube 6 is lower than the atmospheric pressure, and thus the outside air is introduced into the throttle tube 6 through the discharge pipe 4, the canister 1, and the guide pipe 5. At this time, the fuel gas adsorbed onto the active carbon in the canister 1 is desorbed and supplied to the engine along with the introduced air through the throttle tube 6.

The active carbon provided in the canister 1 has the following characteristics:

Fuel gas in gaseous phase is liquefied by the active carbon and adsorbed onto the active carbon. Heat generated when the fuel gas is changed to liquid phase is dissipated to the outside of the canister; and When the fuel gas adsorbed onto the active carbon in liquid phase is introduced into the engine by the flow of the outside air, the fuel gas in liquid phase is evaporated and introduced into the engine in gaseous phase. In this case, the active carbon absorbs the heat around the canister to convert the fuel gas to in gaseous phase.

Meanwhile, the use of hybrid vehicles driven by both an internal combustion engine and an electric motor has been gradually increased to meet the demands for improvement of fuel efficiency of gasoline vehicles and for development of environmentally-friendly vehicles.

Such hybrid vehicles are configured such that gasoline fuel is used to start the engine and electricity is used to drive the vehicle, and thus the amount of fuel gas desorbed from the active carbon in the canister is reduced. That is, when the electricity is used to drive the vehicle, the engine does not require air, and thus the amount of the fuel gas adsorbed in the canister is increased.

In order to solve the above problem, it is necessary to install high-performance active carbon and large-capacity canister in the vehicle such that a larger amount of fuel gas adsorbed onto the active carbon can be evaporated and supplied to the engine for a shorter period of time.

U.S. Pat. No. 6,896,852, U.S. Pat. No. 6,769,415, and Korean Patent Publication No. 10-2007-0049425 disclose canisters for solving the above-described problem.

U.S. Pat. No. 6,896,852 discloses a canister, in which a heater is installed to heat air introduced through a discharge pipe of the canister. The heater heats the air supplied to the canister. The heated air supplies the heat required for the desorption reaction of the canister such that the fuel gas adsorbed onto the active carbon is more easily desorbed.

However, the above-described canister has a problem that the temperature of the air heated by the heater is not greater than 100° C. and the actual temperature of the air heated and supplied to the active carbon is maintained at about 80° C.

Moreover, the heat of the air heated and supplied to the active carbon is absorbed by the active carbon around an inlet port thereof such that the heat is not uniformly distributed to the entire active carbon. As a result, the desorption efficiency of the canister by the heated air is insignificant, which just meets the partial zero emission vehicle (PZEV) standards for exhaust emissions.

U.S. Pat. No. 6,769,415 discloses a canister in which a heating coil is installed in active carbon being in contact with a discharge pipe of the canister to directly heat the active carbon.

However, since the heat is supplied only to the active carbon being in contact with the discharge pipe, the heat is absorbed by the corresponding active carbon, and thereby the heat is not supplied to the entire active carbon. As a result, the desorption efficiency of the canister is insignificant, which just meets the partial zero emission vehicle (PZEV) standards for exhaust emissions.

Meanwhile, Korean Patent Publication No. 10-2007-0049425 discloses a vehicle canister, in which a chamber is provided in a canister housing and a heat storage material such as sodium thiosulfate or sodium phosphate is filled in the chamber to store heat generated by adsorption reaction and supply the stored heat to active carbon during desorption reaction, thus improving adsorption and desorption efficiency of the active carbon.

However, the temperature of the heat generated by the heat storage material filled in the chamber during desorption reaction does exceed a predetermined temperature, and thus the canister does not satisfy the desorption rate required by the hybrid vehicle.

Moreover, when the air is heated by the heater, in the case of the hybrid vehicle powered by both gasoline and electricity, the heater consumes excessive power, reducing the fuel efficiency of the vehicle.

SUMMARY OF THE INVENTION

The present invention has been made in an effort to solve the above-described problems associated with prior art, and an object of the present invention is to provide a canister with a heater which can supply heat, required for desorption of fuel gas adsorbed onto active carbon filled in the canister, to the entire active carbon, thus improving the desorption efficiency of the active carbon.

Moreover, another object of the present invention is to provide a canister with a heater which can reduce the power consumption of the heater, provided to improve the desorption efficiency of the canister, to a minimum level, thus improving the fuel efficiency of a vehicle.

In a first aspect, the present invention provides a canister connected to a fuel tank and a throttle tube and adsorbing and desorbing fuel gas generated in the fuel tank, the canister comprising: a canister housing including a tank port and a purge port, which are provided at the top thereof, and a plurality of inlet holes provided on one side thereof to introduce air; and a heater connected to the top of the plurality of inlet holes of the canister housing and including an air port provided at the top thereof, an open bottom, and a heater module provided therein.

The heater may comprise a heater housing including an open bottom and a connection hole, through which the heater module is inserted, and the heater module horizontally inserted into the connection hole.

The canister housing may comprise a connection portion provided at the top thereof and the heater housing may comprise a connection portion provided at the bottom thereof, the two connection portions being connected to each other by ultrasonic welding.

The heater module may comprise a fixing plate, a positive temperature coefficient (PTC) heater connected to the fixing plate, a heat sink connected to the PTC heater, and a power terminal for supplying electric power to the PTC heater.

The heater may further comprise a diffusion plate interposed between the heater module, inserted into the heater housing, and the heater housing.

The diffusion plate may be spaced from the heater module a predetermined interval.

The heater module provided in the heater housing may be spaced from the bottom of the heater housing a predetermined interval.

The diffusion plate may comprise a plurality of holes, through which air is distributed, and a projection provided in the center of the diffusion plate.

The PTC heater may be heated to about 150 to 180° C. by a current of 3 to 6 A.

The air introduced through the PTC heater into the canister may be heated to about 80 to 110° C. by the PTC heater.

BRIEF DESCRIPTION OF THE DRAWINGS

The above and other features of the present invention will be described with reference to certain exemplary embodiments thereof illustrated the attached drawings in which.

DETAILED DESCRIPTION OF THE INVENTION

Hereinafter, preferred embodiments in accordance with the present invention will be described with reference to the accompanying drawings. The preferred embodiments are provided so that those skilled in the art can sufficiently understand the present invention, but can be modified in various forms and the scope of the present invention is not limited to the preferred embodiments.

Figure 1:
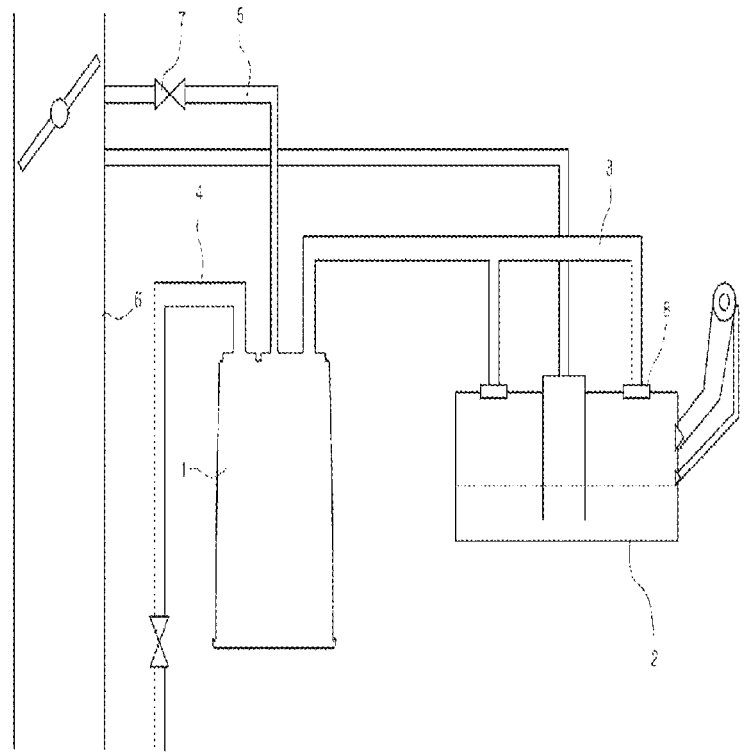
FIG. 1 is a schematic diagram showing the connection between a conventional canister and a fuel tank.
Figure 2:
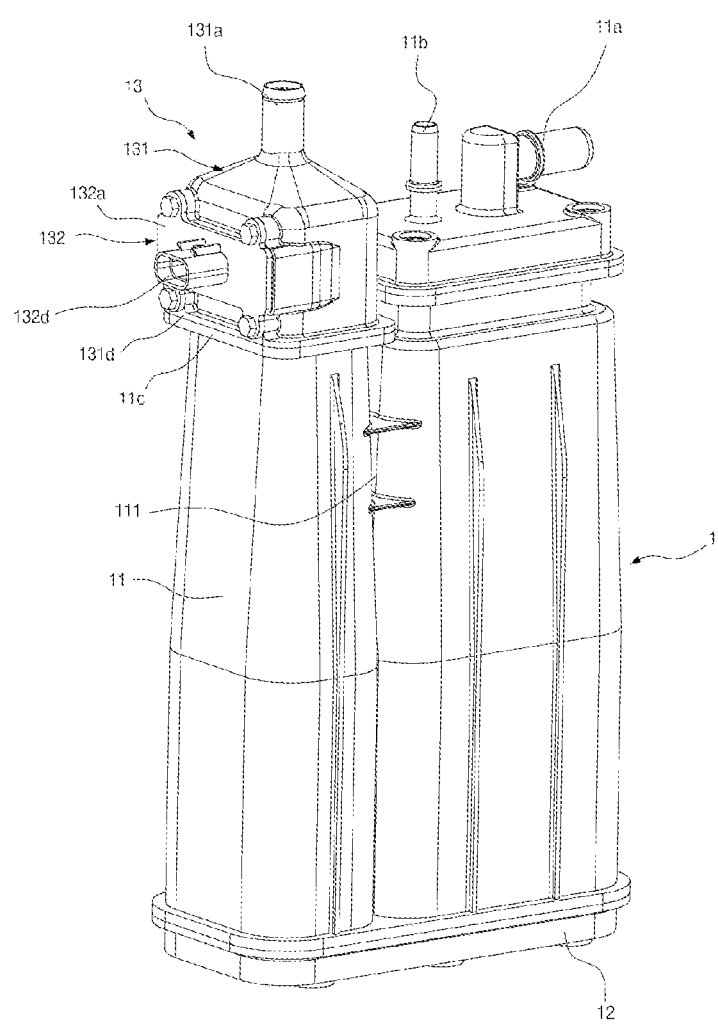
FIG. 2 is a perspective view of a canister with a heater according to a preferred embodiment of the present invention.
Figure 3:
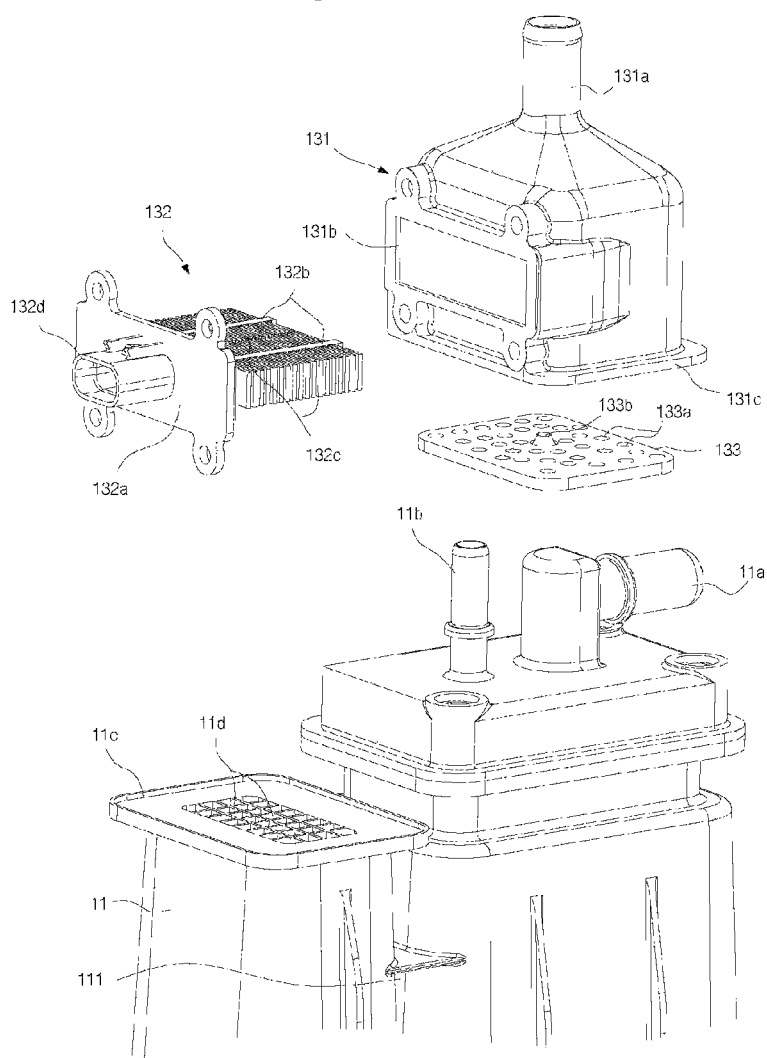
FIG. 3 is a partially exploded perspective view of the canister of FIG. 2.
Figure 4:
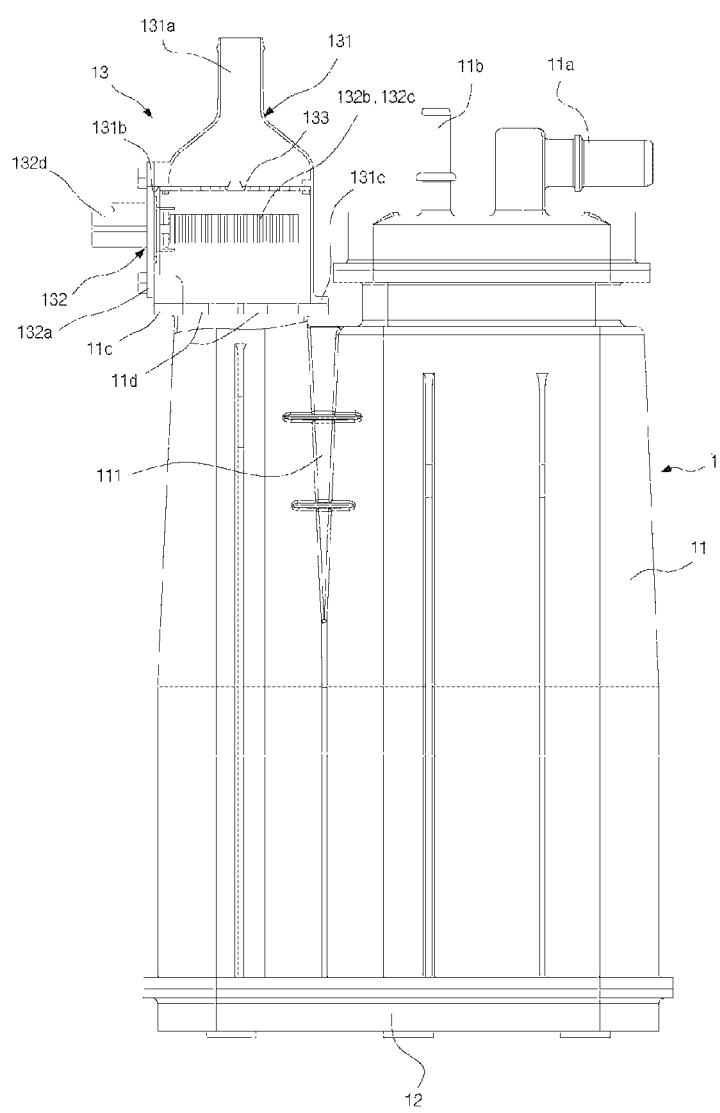
FIG. 4 is a front cross-sectional view of the canister of FIG. 2.
Figure 5:
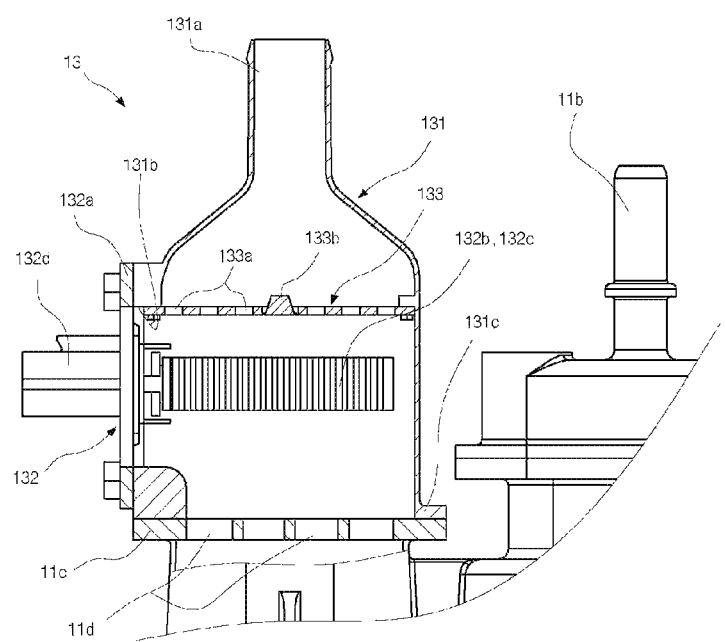
FIG. 5 is a partially enlarged cross-sectional view of the canister of FIG. 2.

FIG. 2 is a perspective view of a canister with a heater according to a preferred embodiment of the present invention, FIG. 3 is a partially exploded perspective view of the canister of FIG. 2, FIG. 4 is a front cross-sectional view of the canister of FIG. 2, and FIG. 5 is a partially enlarged cross-sectional view of the canister of FIG. 2.

The canister 1 includes a canister housing 11 and a lower plate 12 connected to the bottom of the canister housing 11. A heater 13 is provided at the top of the canister housing 11.

Although not shown in the figures, a fuel gas reducing device, a diffusion trap, an active carbon support filter, an active carbon, a strainer, and an elastic member are provided in the canister housing 11.

A vertical partition 111 dividing the inside of the canister housing 11 into two spaces in the longitudinal direction thereof is provided in the middle of the canister housing 11.

The canister housing 11 has a trapezoidal shape with an open bottom in which the width is reduced from the bottom to the top. The inner space of the canister housing 11 is divided into two spaces such as a first space and a second space by the vertical partition 111. The active carbon is filled in the first and second spaces.

Figure 6:
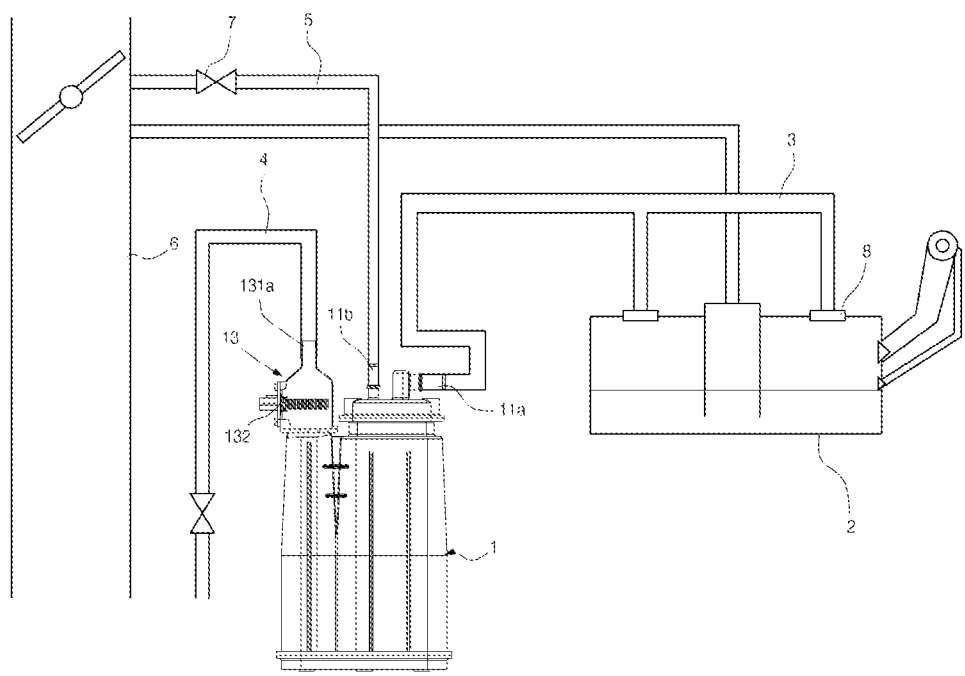
FIG. 6 is a schematic diagram showing the connection between a canister and a fuel tank according to the present invention.

A tank port 11a, through which fuel gas generated from a fuel tank 2 shown in FIG. 6 is introduced, and a purge port 11b, through which the fuel gas is discharged to a guide pipe 5 shown in FIG. 6, are provided at the top of the first space.

Although not shown in the figures, the diffusion trap is provided at the top of the first space. The diffusion trap is provided such that the fuel gas introduced through the tank port 11a can pass through the active carbon over a wider range.

Moreover, although not shown in the figures, the strainer is provided at the bottom of the canister housing 11 to entirely support the active carbon filed in the first and second spaces. The strainer is elastically supported to the lower plate 12 by the elastic member.

A connection portion 11c for connecting the heater 13 to the canister housing 11 is provided at the top of the second space, and a plurality of inlet holes 11d, through which air passing through the heater 13 is introduced into the canister 1, are also provided at the top of the second space. The heater 13 is connected to the connection portion 11c at the top of the second space by ultrasonic welding.

Although not shown in the figures, the second space is divided into a plurality of spaces by a plurality of support filters. Active carbon 13GRADE and active carbon 11GRADE are filled in the plurality of spaces, respectively.

The heater 13 includes a heater housing 131, a heater module 132, and a diffusion plate 133 provided at the top of the heater module 132.

The heater housing 131 includes an open bottom and an air port 131a provided at the top thereof. Moreover, a connection hole 131b, through which the heater module 132 is connected to the inside of the heater housing 131, is provided on one side of the heater housing 131. A plurality of holes for connecting the heater module 132 to the heater housing 131 using separate fastening members are provided at the outside of the connection hole 131b.

A connection portion 131c for connecting the heater housing 131 to the canister housing 11 is provided at the bottom of the heater housing 131. The connection portion 131c is connected to the connection portion 11c provided at the top of the canister housing 11. Here, the connection portion 131c and the connection portion 11c are connected to each other by ultrasonic welding.

The heater module 132 includes a fixing plate 132a for fixing the heater module 132 to the heater housing 131 and a heater unit 132b fixed on the fixing plate 132a. Here, as the heater unit 132b, a positive temperature coefficient (PTC) heater unit, which can generate heat to a temperature of about 150 to 180° C., may be used. Of course, the type of the heater unit 132b is not particularly limited, but any heater with high thermal efficiency may be used.

A heat sink 132c for more efficiently dissipating heat generated from the PTC heater unit 132b is provided at both sides of the PTC heater unit 132b.

Further, a power terminal 132d for supplying electric power to the PTC heater unit 132b is provided on the fixing plate 132a. The power terminal 132d is electrically connected to a power cable connected to an engine of a vehicle.

The fixing plate 132a includes a plurality of holes for connecting the fixing plate 132a to the heater housing 131 using separate fastening members.

Furthermore, although not shown in the figure, a gasket is interposed between the heater housing 131 and the heater module 132, and a control module for controlling the PTC heater unit 132b is provided in the heater module 132.

When the heater module 132 is connected to the heater housing 131, the PTC heater unit 132b and the heat sink 132c are fixed horizontally to the heater housing 131. Therefore, the air introduced through the air port 131a passes vertically through the PTC heater unit 132b and the heat sink 132c.

The power terminal 132d is electrically connected to a power supply such as a power generating motor of the vehicle, for example. The power terminal 132d may be appropriately configured to receive electric power when the engine of the vehicle is operated. That is, when the engine of the vehicle is operated, electric power is supplied through the power terminal 132d to the PTC heater unit 132b to be operated.

The diffusion plate 133 has an outer diameter which corresponds to the inner diameter and shape of the heater housing 131. The diffusion plate 133 includes a plurality of holes 133a and a projection 133b provided in the center of the diffusion plate 133. The diffusion plate 133 is connected to the heater housing 131 corresponding to the top of the heater module 132 using a separate fastening member.

The air fed through the air port 131a is uniformly distributed through the plurality of holes 133a formed in the diffusion plate 133 and passes vertically through the heater module 132. Therefore, the air fed through the air port 131a is uniformly heated by the heater module 132.

The diffusion plate 133 and the heater module 132 are spaced a predetermined distance to ensure a space for the distribution of air, and the heater module 132 and the connection portion 131c are also spaced a predetermined distance for the distribution of air.

Next, the operation of the canister having the above-described configuration will be described with reference to FIG. 6. FIG. 6 is a schematic diagram showing the connection between the canister and a fuel tank according to the present invention.

Referring to FIG. 6, when the liquid fuel stored in the fuel tank 2 is evaporated by external temperature, for example, while the engine is stopped, the pneumatic pressure in the fuel tank 2 is increased by the evaporated fuel gas. The evaporated fuel gas is introduced into the tank port 11a of the canister 1 through the inlet pipe 3 connected to the fuel tank 2 by the pneumatic pressure.

The fuel gas introduced into the tank port 11a moves to the bottom through the first space of the canister 1 and flows into the second space.

At this time, the fuel gas is liquefied and adsorbed by the active carbon filled in the canister 1, and the remaining fuel gas, which is not adsorbed onto the active carbon, is discharged to the outside through the air port 131a.

Subsequently, when a driver starts the vehicle to run the engine, the pneumatic pressure of a throttle tube 6 is reduced and a control valve 7 is opened. Accordingly, the outside air is introduced into the canister 1 through a discharge pipe 4 and the air port 131a, flows through the canister 1 in a direction opposite to the flow direction of the fuel gas, is introduced into the throttle tube 6 through the purge port 11b and the guide pipe 5, and is then supplied to the engine.

Meanwhile, when the engine of the vehicle is running, electric power is supplied to the PTC heater unit 132b provided in the canister 1. Then, the PTC heater unit 132b is heated to about 150 to 180° C. by a current of 3 to 6 A, and the heat generated from the PTC heater unit 132b heats the air introduced through the air port 131a.

That is, the air introduced through the air port 131a is distributed through the diffusion plate 133 and passes through the space formed between the diffusion plate 133 and the heater module 132. At this time, the air passing through the heater module 132 is heated to about 80 to 110° C. by the heat generated from the heat module 132. The thus heated air is introduced into the canister housing 11 through the lower space of the heater module 132.

Meanwhile, when the heated air is introduced into the canister housing 11, the thermal energy accumulated in the air is supplied to the active carbon filled in the canister 1 to increase the temperature of the active carbon, and thus the fuel gas adsorbed onto the active carbon is easily evaporated. Then, the evaporated fuel gas flows together with the air introduced through the air port 131*a* and is then discharged through the purge port 11*b*.

That is, according to the present invention, when the engine of the vehicle is running, the PTC heater unit 132*b* is driven to heat the air supplied to the canister housing 11. Therefore, most fuel gas adsorbed onto the active carbon is evaporated and discharged through the purge port 11*b*.

Moreover, the air supplied to the canister housing 11 can be heated to about 80 to 110° C. with a low current of 3 to 6 A by the use of the PTC heater unit 132*b*, and thus the consumption of power and fuel can be minimized.

As described above, according to the present invention, the air supplied to the canister is heated by the heater such that the active carbon in the canister absorbs the heat of the air, and thus the fuel gas adsorbed onto the active carbon can be more efficiently discharged.

Moreover, the power consumed by the heater is minimized, and the thus fuel efficiency of the vehicle is improved.

As above, preferred embodiments of the present invention have been described and illustrated, however, the present invention is not limited thereto, rather, it should be understood that various modifications and variations of the present invention can be made thereto by those skilled in the art without departing from the spirit and the technical scope of the present invention as defined by the appended claims.

What is claimed is:

1. A canister, that is connected to a fuel tank and a throttle tube, and that adsorbs and desorbs fuel gas generated in the fuel tank, wherein the canister comprises:
   a canister housing including a tank port and a purge port, which are provided at the top thereof, and a plurality of inlet holes provided on one side thereof to introduce air;
   a heater connected to the top of the plurality of inlet holes of the canister housing and including an air port provided at the top thereof, an open bottom, and a heater module provided therein;
   wherein the heater comprises a heater housing including an open bottom and a connection hole, through which the heater module is inserted, and the heater module inserted into the connection hole:
   wherein the heater module comprises a fixing plate, a positive temperature coefficient (PTC) heater connected to the fixing plate, a heat sink connected to the PTC heater unit, and a power terminal for supplying electric power to the PTC heater unit: and
   wherein the air fed through the air port passes through the heat sink of the PTC heater and is heated, and then the heat of the air generated at the PTC heater is absorbed by the active carbon in the canister.

2. The canister of claim 1, wherein the canister housing comprises a connection portion provided at the top thereof and the heater housing comprises a connection portion provided at the bottom thereof, the two connection portions being connected to each other by ultrasonic welding.

3. The canister of claim 1, wherein the heater further comprises a diffusion plate interposed between the heater module that is inserted into the heater housing, and the heater housing.

4. The canister of claim 3, wherein the diffusion plate is spaced from the heater module a predetermined interval.

5. The canister of claim 1, wherein the heater module provided in the heater housing is spaced from the bottom of the heater housing a predetermined interval.

6. The canister of claim 3, wherein the diffusion plate comprises a plurality of holes, through which air is distributed, and a projection provided in the center of the diffusion plate.

7. The canister of claim 1, wherein the PTC heater unit is heated to about 150 to 180° C. by a current of 3 to 6 A.

8. The canister of claim 1, wherein the air introduced through the PTC heater unit into the canister is heated to about 80 to 110° C. by the PTC heater unit.

* * * * *